(12) United States Patent
Crespo De La Vina

(10) Patent No.: US 11,044,395 B2
(45) Date of Patent: Jun. 22, 2021

(54) METHOD FOR GENERATING A REPRESENTATION OF AN ENVIRONMENT BY SHIFTING A VIRTUAL CAMERA TOWARDS AN INTERIOR MIRROR OF A MOTOR VEHICLE; AS WELL AS CAMERA DEVICE

(71) Applicant: Connaught Electronics Ltd., Tuam (IE)

(72) Inventor: Arturo Crespo De La Vina, Tuam (IE)

( * ) Notice: Subject to any disclaimer, the term of this patent is extended or adjusted under 35 U.S.C. 154(b) by 0 days.

(21) Appl. No.: 16/960,431

(22) PCT Filed: Dec. 20, 2018

(86) PCT No.: PCT/EP2018/086050
§ 371 (c)(1),
(2) Date: Jul. 7, 2020

(87) PCT Pub. No.: WO2019/134838
PCT Pub. Date: Jul. 11, 2019

(65) Prior Publication Data
US 2020/0336658 A1    Oct. 22, 2020

(30) Foreign Application Priority Data
Jan. 8, 2018 (DE) .................. 10 2018 100 211.4

(51) Int. Cl.
*H04N 5/232* (2006.01)
*B60R 1/00* (2006.01)
(Continued)

(52) U.S. Cl.
CPC ........... *H04N 5/23229* (2013.01); *B60R 1/00* (2013.01); *H04N 5/23299* (2018.08);
(Continued)

(58) Field of Classification Search
CPC ................ B60R 1/00; B60R 2300/105; B60R 2300/303; B60R 2300/602;
(Continued)

(56) References Cited

U.S. PATENT DOCUMENTS 8,866,905 B2 * 10/2014 Yamamoto ................ B60R 1/00
 348/148
2012/0249789 A1 * 10/2012 Satoh .................. G06K 9/00832
 348/143
(Continued)

FOREIGN PATENT DOCUMENTS

| DE | 102015000794 A1 | 8/2015 |
|---|---|---|
| WO | 2015002031 A1 | 1/2015 |
| WO | 2017089719 A1 | 6/2017 |

OTHER PUBLICATIONS

International Search Report and Written Opinion in corresponding International Application No. PCT/EP2018/086050, dated Mar. 14, 2019 (9 pages).

(Continued)

*Primary Examiner* — Peet Dhillon
(74) *Attorney, Agent, or Firm* — Osha Bergman Watanabe & Burton LLP

(57) ABSTRACT

The invention relates to a method for generating a representation of an environment (U) of a vehicle (1) including the steps of:
 capturing respective images by means of a first camera (2) and a second camera (2)
 generating a virtual image (31) of a virtual camera (3) from the images, wherein
 at least a first perspective, in which the environment (U) of the vehicle (1) is represented from a bird's eye perspective, for a first virtual camera position (33) and a second perspective, in which exclusively an area of the environment (U) of the vehicle (1) rearwards
(Continued)

Figure 1:
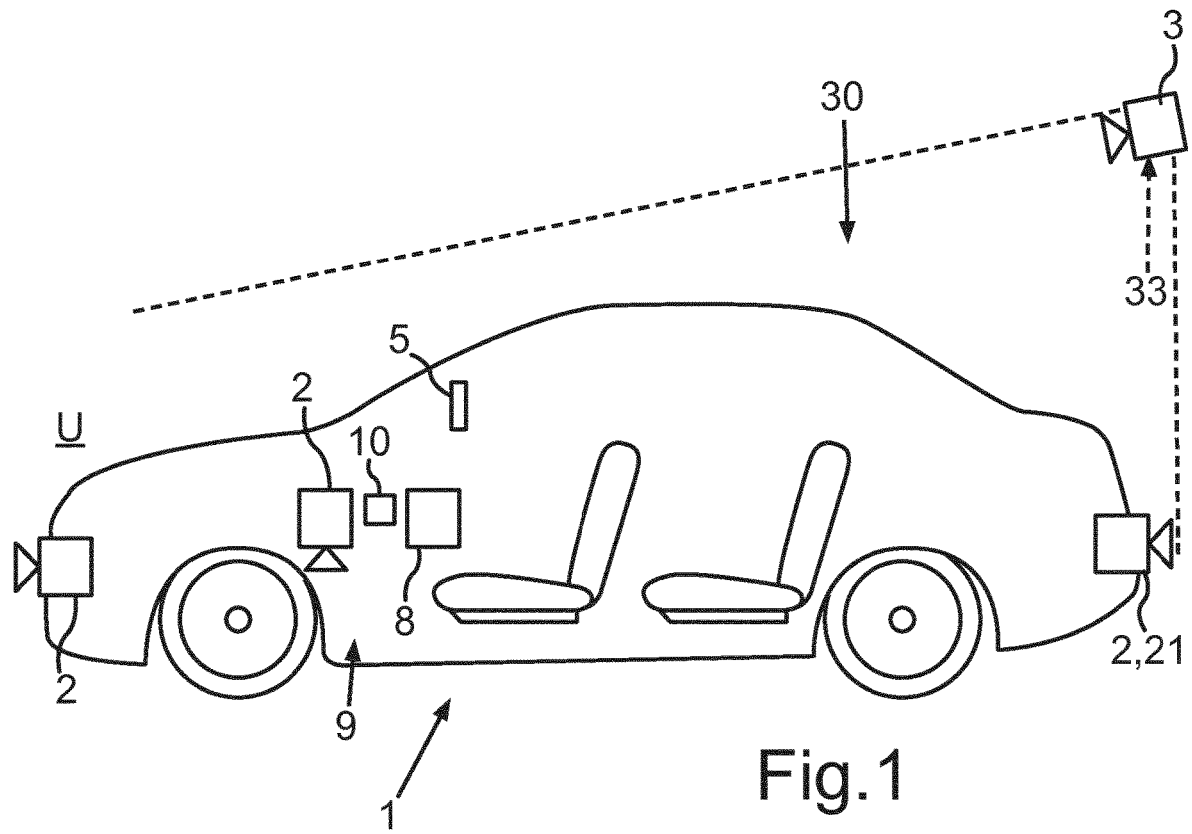

related to the vehicle (1) is represented, for a second virtual camera position (44) of the virtual camera (3) are selectable for the virtual image.

In order to allow an improved overview, it is provided that the representation of the environment (U) by the virtual image (31) is adapted to a shift of the virtual camera (3) towards an interior mirror (8) of the vehicle (1) upon switching from the first perspective to the second perspective of the virtual image (31) and to a rotation of the virtual camera (3) upon reaching a mirror plane of the interior mirror (8).

12 Claims, 3 Drawing Sheets

(51) Int. Cl.
  *H04N 5/247* (2006.01)
  *H04N 7/18* (2006.01)
(52) U.S. Cl.
  CPC ............ *H04N 5/247* (2013.01); *H04N 7/181* (2013.01); *B60R 2300/105* (2013.01); *B60R 2300/303* (2013.01); *B60R 2300/607* (2013.01)

(58) Field of Classification Search
  CPC ... B60R 2300/607; G06T 13/80; G06T 15/04; G06T 19/003; H04N 7/181; H04N 5/247; H04N 5/2257; H04N 5/23229
  See application file for complete search history.

(56) References Cited

U.S. PATENT DOCUMENTS

| | | |
|---|---|---|
| 2012/0257058 A1 | 10/2012 | Kinoshita et al. |
| 2014/0152778 A1* | 6/2014 | Ihlenburg .............. G06T 15/205 348/47 |
| 2016/0182823 A1* | 6/2016 | Murasumi ............... B60R 11/04 348/38 |
| 2018/0056870 A1* | 3/2018 | Kosugi ..................... B60R 1/00 |

OTHER PUBLICATIONS

German Search Report in corresponding German Application No. 10 2018100211.4, dated Dec. 5, 2018 (5 pages).

* cited by examiner

METHOD FOR GENERATING A REPRESENTATION OF AN ENVIRONMENT BY SHIFTING A VIRTUAL CAMERA TOWARDS AN INTERIOR MIRROR OF A MOTOR VEHICLE; AS WELL AS CAMERA DEVICE

The invention relates to a method for generating a representation of an environment of a vehicle. A second aspect of the invention relates to a computer program product with program code means, which are suitable to perform the mentioned method. The invention additionally relates to a computer-readable medium, on which the above mentioned program code means are stored. A fourth aspect of the invention relates to a camera device for generating a representation of an environment of a vehicle.

The representation of an environment of a vehicle by a camera system is known from the prior art. For example, the camera system can be formed for representing the vehicle and the environment thereof from a bird's eye perspective (also called surround view system) or for representing an area rearwards related to the vehicle (reversing camera). For providing the representation from the bird's eye perspective (also called surround view), the vehicle comprises multiple cameras, usually four cameras, wherein the respective images of the multiple cameras are distorted in perspective and composed. In particular, the respective images of the multiple cameras are processed to a virtual image of a virtual camera. Therein, the virtual camera is in particular located in a bird's eye perspective related to the vehicle. In other words, a virtual image is generated by processing the respective images of the multiple cameras, which is adapted to an image as it would be captured by the virtual camera. For providing a reversing camera, only a single camera at the rear of the vehicle is usually employed, the image of which can be directly displayed for representing the environment.

It can be provided that both systems, surround view and reversing camera, are commonly employed in the vehicle. In this case, a user, in particular the driver, of the vehicle can switch between the two systems. Alternatively, DE 10 2015 000 794 A1 discloses automatic switching between the two systems.

The representation of the environment from the bird's eye perspective or the representation of the environment by the reversing camera can be displayed to the user, in particular the driver, on a screen of the vehicle. In this manner, an overview of the driver over the vehicle can be improved, in particular in critical driving maneuvers and/or parking maneuvers. Thus, the surround view system and the reversing camera can be a driver assistance system for improving an overview over the vehicle and the environment thereof.

Conventionally, it is switched between the bird's eye perspective and the reversing camera, wherein a loss of orientation can arise for the user or the driver. In particular, the user or driver first has to relate the representation of the environment on the screen to the environment of the vehicle visible to him after each switching operation. Only subsequently, the representation of the environment can again be used for improving the overview.

The invention is based on the object to allow an improved overview by suitable representation of the environment of a vehicle.

This task according to the invention is solved by the subject matters of the independent claims. Advantageous embodiments with expedient further developments are subject matter of the sub-claims.

A first aspect of the invention relates to a method for generating a representation of an environment of a vehicle including the steps of: Capturing a first image by means of a first camera, capturing a second image by means of a second camera, and generating a virtual image of a virtual camera from the first image and the second image, wherein at least a first perspective for a first virtual camera position of the virtual camera and a second perspective for a second virtual camera position of the virtual camera are selectable for the virtual image. Therein, the environment of the vehicle is represented from a bird's eye perspective in the first perspective and exclusively an area of the environment of the vehicle rearwards related to the vehicle is represented in the second perspective. The first perspective can be a bird's eye perspective or a perspective view of the vehicle and the environment thereof. In other words, the representation of the environment according to the first perspective is adapted to a surround view system. The second perspective can be a perspective of a reversing camera. In some embodiments, the first camera is formed as a reversing camera, wherein the virtual image in the second perspective corresponds to the first image.

Now, in order to allow an improved overview for a user or driver, it is provided that the representation of the environment is continuously transferred from the first perspective to the second perspective upon switching from the first perspective to the second perspective of the virtual image such that the representation of the environment by the virtual image is adapted to a shift of the virtual camera towards an interior mirror of the vehicle upon switching and to a rotation of the virtual camera upon reaching a mirror plane of the interior mirror. In other words, the perspective of the virtual image is not directly switched from the first perspective to the second perspective, but a continuous shift of the perspective of the virtual image from the first perspective to the second perspective occurs. In particular, the transition from the first to the second perspective is represented in a continuous animation. Thereby, the representation of the environment of the vehicle is also particularly well comprehensible during switching and directly after switching, wherefrom an improved overview over the environment ensues for a user.

In terms of the represent application, the word "image" in particular also denotes an image signal, for example a digital or analog image signal or a video signal. The image can be an individual image, an image sequence or a moving image, in particular a video.

A development provides that a further virtual image for a further virtual camera is generated from the first image and the second image and is integrated in the virtual image in terms of an image-in-image representation during switching. Presently, the invention is described based on two cameras and associated two images. This corresponds to the minimum configuration to be able to represent different perspectives. However, the invention is therein expressly not restricted to the use of the images of two cameras. Analogously, the method according to the invention can be performed with three, four, five or more cameras. In this case, the virtual image is composed of the respective images of the three, four, five or more cameras. Usually, a surround view system is composed of four cameras. In particular, the first perspective and the second perspective of the virtual image are not dependent on the number of the cameras. Preferably, the method is performed with four cameras. For example, the first camera is disposed at the rear of the vehicle, preferably in terms of a reversing camera, the second camera is disposed in a front area of the vehicle, and the third camera and the fourth camera are laterally disposed. The second camera can be disposed in a front area of the vehicle. The third and the fourth camera can be disposed laterally at the vehicle, for example at the exterior mirrors. The cameras are in particular cameras of a surround view system as it is known from the prior art.

A development of the invention provides that a further virtual image for a further virtual camera is generated from the first image and the second image and is integrated in the virtual image in terms of an image-in-image representation during switching. Therein, the further virtual image can have a perspective to the environment of the vehicle different from the virtual image. If the virtual image is composed of two, three, four, five or more images, thus, the further virtual image can also be composed of the images of the two, three of the respective images of the same two, three, four, five or more cameras. An even better overview over the environment can be provided by the further virtual image.

According to a development, it is provided that a perspective of the further virtual image is opposite to a perspective of the virtual image during switching. In particular, it is provided that during switching from the first perspective to the second perspective, an area of the environment frontwards related to the vehicle is substantially represented by the virtual image. In this case, it can be provided that at least substantially an area of the environment at least substantially rearwards related to the vehicle is represented by the further virtual image during switching. In particular, it is provided that the further virtual image of the perspective of the virtual image is opposite to the perspective of the virtual image during shift, thus during the visualization of the shift of the virtual camera, upon reaching the mirror plane of the interior mirror. Upon reaching the mirror plane, the virtual image can take the same perspective as the further virtual image to visualize the rotation of the virtual camera. For example, the perspective of the further virtual image corresponds to the second perspective of the virtual image. In other words, the second perspective of the virtual image can be integrated in the virtual image as the further virtual image already during switching. Hereby, a further improvement of the representation of the environment can be achieved.

According to a development, it is provided that a reflection of the area of the environment of the vehicle rearwards related to the vehicle is represented in the interior mirror by the further virtual image. In other words, an area is omitted during switching by the virtual image, in which the interior mirror is located. The further virtual image is integrated in the virtual image in terms of the image-in-image representation in this omitted area. Hereby, the reflection of the area of the environment rearwards related to the vehicle, which would be visible in the interior mirror in a real image of a real camera, can be visualized. Hereby, the problem is solved that for the visualization of the shift of the virtual camera towards the interior mirror, there is no image available which actually captures the interior mirror. This is in particular the case since the cameras, in particular the first and the second camera, are outside of or external to the vehicle. Thus, the optical impression of a reflection of the rearward area can be generated in the interior mirror during switching. As soon as the perspective of the virtual image reaches the interior mirror, in other words, thus, the virtual camera reaches the mirror, the further virtual image can occupy the entire virtual image.

Thus, the area of the environment rearwards related to the vehicle is exclusively represented.

A development provides that a capturing range of the virtual camera in the second virtual camera position is adapted to the capturing range of the interior mirror. In other words, the virtual image represents the image of a virtual camera, which is in a position of the interior mirror. However, the virtual image can therein be such that exclusively the environment of the vehicle is represented and a representation of the interior of the vehicle is omitted. Thus, the rearward area of the environment of the vehicle can be represented by the virtual image in the manner of an interior mirror, wherein the vehicle is transparent. In this manner, the rearward area can be represented to the driver from a usual perspective and a high degree of overview can be provided at the same time.

A development provides that the perspective of the virtual image is shifted from outside of the vehicle through a rear window of the vehicle towards the interior mirror upon switching from the first perspective to the second perspective of the virtual image such that the representation by the virtual image is adapted to a shift of the virtual camera from outside of the vehicle through the rear window of the vehicle towards the interior mirror upon switching. In other words, upon switching from the first perspective to the second perspective, the interior mirror is increasingly enlarged in the representation by virtual spatial approach of the virtual camera. In particular, this is combined with the image-in-image representation of the rearward area in the area of the virtual image, in which the interior mirror is located. In this manner, the virtual image can be led over to the second perspective from the bird's eye perspective or the perspective representation of the vehicle in the first perspective of the virtual image by zooming in to the interior mirror utilizing the reflection of the interior mirror.

Upon reaching the mirror plane of the interior mirror, the virtual camera can be rotated by an angle between 160° and 200°, in particular preferably 170° and 190°, in particular 180°. Thereby, it can be visualized that the virtual camera first is moved towards the interior mirror and is adapted to the capturing range of the interior mirror upon reaching the mirror surface.

During switching, interior areas of the vehicle can be generated by animation in the virtual image and only areas of the virtual image, which represent the environment of the vehicle, can be generated from the first and the second image. In other words, areas of the virtual image and optionally of the further virtual image, which represent interior areas of the vehicle, are not generated from the first image or the second image, but animated. The underlying animation can for example be recorded on a storage unit and be retrieved from it. In this manner, it is not required to capture the interior areas of the vehicle by means of one of the images.

In particular, exclusively such areas of the virtual image, which represent windows of the vehicle, are generated from the first image and the second image during switching. While the virtual camera is within the vehicle during switching, exclusively areas of the virtual image, which represent windows of the vehicle, are in particular generated from the first and the second image. In other words, during switching, areas of the environment of the vehicle, which are visible through the windows of the vehicle for a perspective of the virtual image, which is adapted to a virtual camera within the vehicle, are generated from the first and the second image.

A second aspect of the invention relates to a computer program product with program code means, which are stored in a computer-readable medium, to perform a method for generating a representation of an environment of a vehicle according to any one of the preceding claims when the computer program product is run on a processor of an electronic control unit.

A third aspect of the invention relates to a computer-readable medium, in particular in the form of a computer-readable floppy disk, DVD, CD, memory card, USB storage unit or the like, in which program code means are stored, to perform the method for generating a representation of an environment of a vehicle when the program code means are loaded into a memory of an electronic control unit and run on a processor of the electronic control unit.

A fourth aspect of the invention relates to a camera device for generating a representation of an environment of a vehicle comprising a first camera for capturing a first image, a second camera for capturing a second image and a computing unit for generating a virtual image of a virtual camera from the first image and the second image wherein at least a first perspective with a first virtual camera position of the virtual camera and a second perspective with a second virtual camera position of the virtual camera are selectable for the virtual image, and wherein the computing unit is formed to represent the environment of the vehicle from a bird's eye perspective in the first perspective and to exclusively represent an area of the environment of the vehicle rearwards related to the vehicle in the second perspective. For solving the object according to the invention, it is provided that the computing unit is formed to continuously transfer the representation of the environment from the first perspective to the second perspective upon switching from the first perspective to the second perspective of the virtual image such that the representation of the environment by the virtual image is adapted to a shift of the virtual camera towards an interior mirror of the vehicle upon switching and to a rotation of the virtual camera upon reaching a mirror plane of the interior mirror. In other words, the representation by the virtual image is adapted to the shift of the virtual camera towards the interior mirror with a subsequent rotation of the virtual camera, in particular by 180°.

A fifth aspect of the invention relates to a vehicle which comprises said camera device. In particular, the vehicle is configured as a motor vehicle, preferably as an automobile, for example as a passenger car or truck. The vehicle can comprise a combustion drive and/or an electric drive.

Advantageous embodiments and developments of the above mentioned method analogously also apply to the camera device according to the invention. For reasons of clarity and brevity, the individual developments and the advantages thereof are here not again described.

Further features of the invention are apparent from the claims, the figures and the description of figures. The features and feature combinations mentioned above in the description as well as the features and feature combinations mentioned below in the description of figures and/or shown in the figures alone are usable not only in the respectively specified combination, but also in other combinations without departing from the scope of the invention. Thus, implementations are also to be considered as encompassed and disclosed by the invention, which are not explicitly shown in the figures and explained, but arise from and can be generated by separated feature combinations from the explained implementations. Implementations and feature combinations are also to be considered as disclosed, which thus do not comprise all of the features of an originally formulated independent claim. Moreover, implementations and feature combinations are to be considered as disclosed, in particular by the implementations set out above, which extend beyond or deviate from the feature combinations set out in the relations of the claims.

Figure 2A:
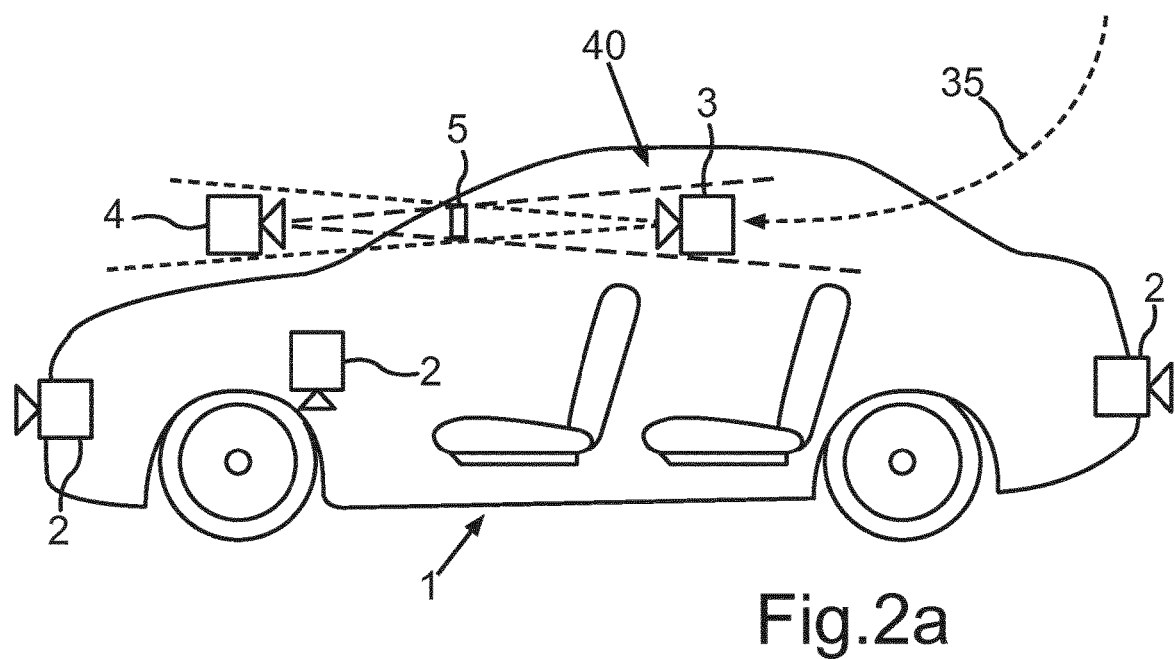
Figure 2B:
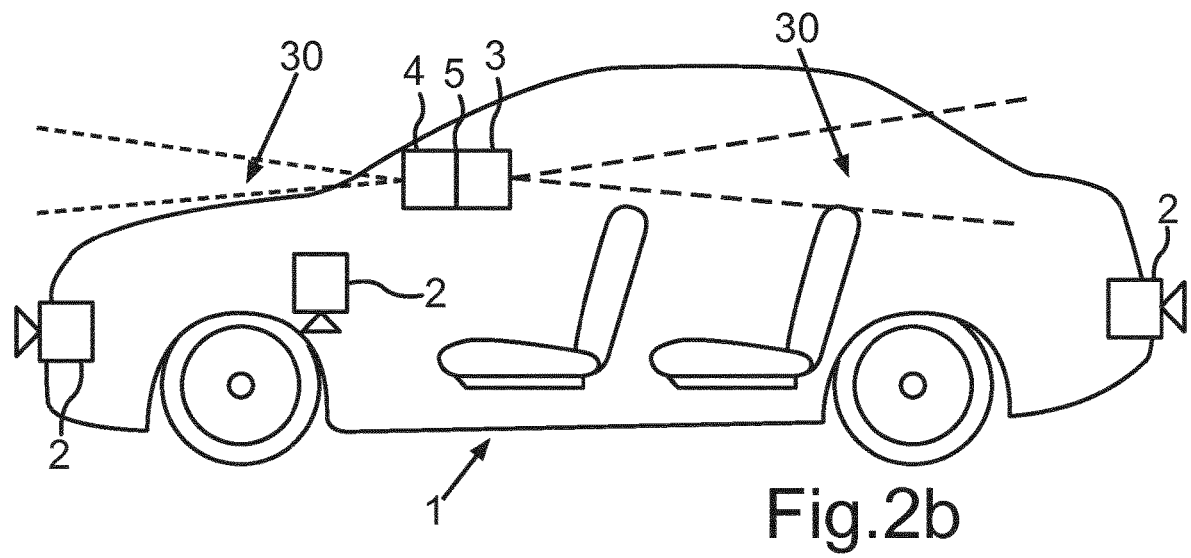
Figure 3:
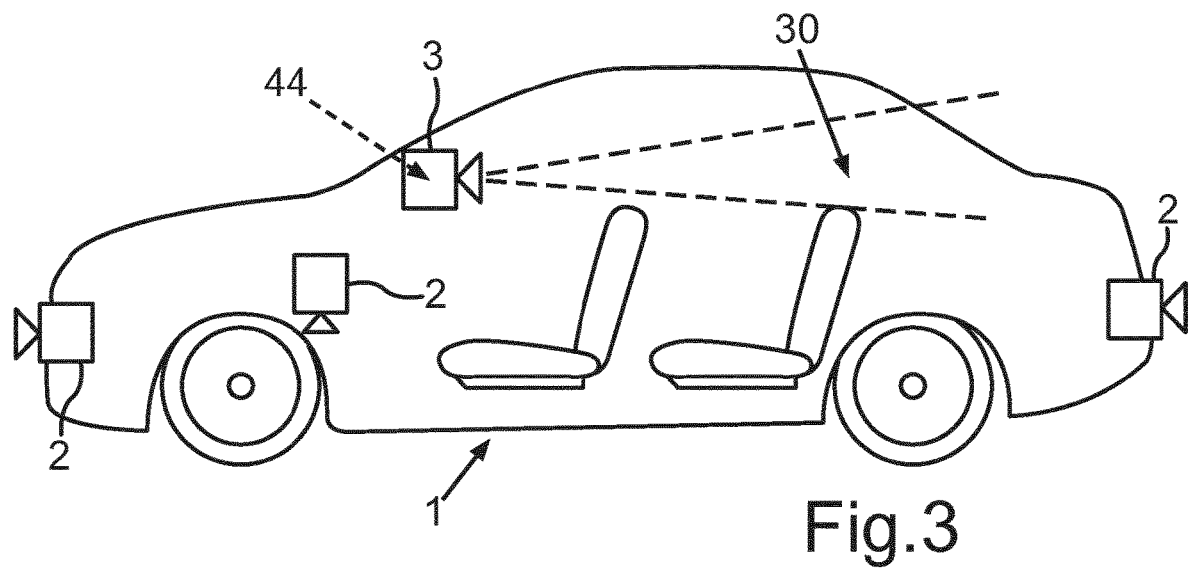
Figure 4:
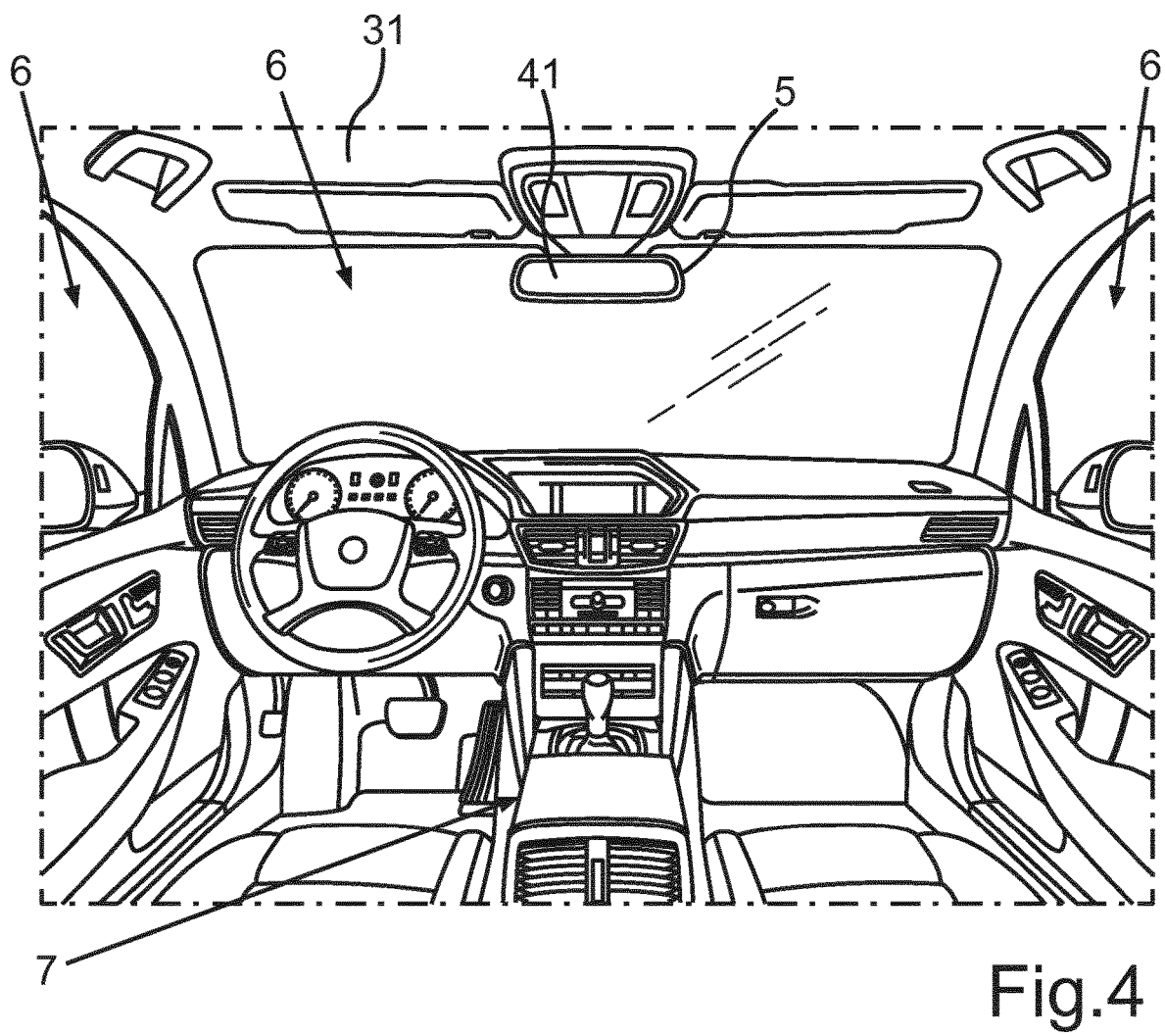

There show:

FIG. 1 in a schematic side view, a vehicle with multiple cameras, from the respective images of which a perspective view of the vehicle and the environment thereof is generated;

FIGS. 2a and 2b also in a schematic side view, the shift of a perspective of a virtual image from the perspective view according to FIG. 1 to a view facing rearwards related to the vehicle;

FIG. 3 the vehicle from FIG. 1, wherein the virtual image is generated with a second perspective for another virtual camera position of the virtual camera; and FIG. 4 an exemplary image-in-image representation for the virtual camera image and a further virtual camera image.

FIG. 1 shows a vehicle 1 with a camera device 9 including multiple cameras 2 in a schematic side view. A first one of the cameras 2 is disposed at a rear of the vehicle 1, wherein its capturing range is oriented rearwards related to the vehicle. A second one of the cameras 2 is disposed in a front area at the vehicle 1, wherein its capturing range is oriented to the front. A third one and a fourth one of the cameras 2 are respectively disposed at the left and right exterior mirror of the vehicle 1, respectively, wherein their capturing range is oriented to bottom left and bottom right, respectively related to the vehicle 1. A virtual image 31 is generated from the images of the cameras 2. Hereto, the respective images of the cameras 2 can be cropped, stretched, compressed, composed and/or processed in any other manner.

The camera device 9 further comprises a computing unit 10, which is formed to generate the virtual image 31 from the respective images of the cameras 2. The virtual image 31 represents an environment U of the vehicle 1 from a first perspective. The first perspective is presently a bird's eye perspective or a perspective rear view of the vehicle 1. The virtual image in the first perspective is adapted to a virtual image 31, the image of a virtual camera 3 in a first virtual camera position 33. Thus, the virtual image 31 in the first perspective represents a capturing range 30 in the first virtual camera position 33. In other words, the virtual image 31 in the first perspective is adapted to the image of the virtual camera 3 in the first virtual camera position 33 with the capturing range 30. This can be a system for displaying the environment U from a bird's eye perspective. Such a system is also referred to as a "surround view system" and the associated perspective as a "surround view", respectively.

It is known from the prior art to represent the image of a reversing camera 21 disposed at the rear of the vehicle 1 for improving the overview of a user or a driver of the vehicle 1. For example, the vehicle 1 comprises a screen 8, on which the virtual image of the first perspective or the surround view or the image of the reversing camera 21 can be optionally displayed. For example, it is allowed to the user or driver to change between both representation s of the environment U and to select one of the representation s of the environment U, respectively. In order to allow an improved overview over the environment U and for example to avoid loss of orientation of the driver upon switching from the first perspective to the second perspective, it is switched from the first perspective of the virtual image 31 to a second perspective of the virtual image 31 as follows. In the second perspective of the virtual image 31, exclusively an area of the environment U of the vehicle 1 rearwards related to the vehicle 1 is represented.

According to FIG. 2a and FIG. 2b, the perspective of the virtual image 31 is shifted towards an interior mirror 5 of the vehicle 1. Therein, the shift of the perspective of the virtual image 31 is effected such that the shift of the perspective is adapted to a shift of the virtual camera position of the virtual camera from the first virtual camera position 33 towards the interior mirror 5. Presently, the perspective of the virtual image 31 is shifted through a rear window of the vehicle 1 towards the interior mirror 5. Such a virtual image 31 results therefrom, which is adapted to the image of the virtual camera 3 when it is shifted through the rear window of the vehicle 1 towards the interior mirror 5. According to FIG. 2a, the perspective of the virtual image 31 is adapted to a shift of the virtual camera 3 along a vector 35 during switching. In other words, the perspective of the virtual image 31 is shifted from outside of to within the vehicle 1.

FIG. 4 exemplarily shows the virtual image 31 for a virtual camera position of the virtual camera 3 according to FIG. 2a. The virtual image 31 is adapted to an image of the virtual camera 3, which is located in the interior of the vehicle 1.

According to FIG. 4, both areas 6 outside of the vehicle 1 and areas 7 within the vehicle 1 are represented as a part of the virtual image 31. The areas 7 within the vehicle 1 for example relate to A, B, C pillar, dashboard and seats. These areas 7 of the virtual image 31 are generated by animation of an interior of the vehicle 1. For example, the areas 7 are taken from a pre-fabricated video capture stored in a storage device of the vehicle 1. Alternatively, the areas 7 can be visualized by computer simulation of the interior of the vehicle 1. In case of the computer animation, it is advantageously possible to adapt the visualization of the areas 7 to an installed interior design of the vehicle 1 (for example material and color of the seats, installed steering wheel, installed manual transmission or automatic transmission).

The areas 6, in particular window areas of the vehicle 1, can be generated from the respective images of the cameras 2. The areas 6 are presently areas of the virtual image 31 and optionally of the further virtual image 41, which represent windows of the vehicle 1. In other words, the areas 6 can be such areas, in which the environment U is visible through windows of the vehicle 1. In particular, the areas 6 of the virtual image 31, which represent the environment U, are generated by cropping, stretching, compressing and composing the respective images of the cameras 2.

A further virtual image 41 is represented as a part of the virtual image 31 according to an image-in-image representation. Presently, the further virtual image serves for representing the reflection in the interior mirror 5. The further virtual image 41 is adapted to an image, which is generated by a further virtual camera 4. The perspective of the further virtual image 41 is presently opposite to the perspective of the virtual image 31. Thus, a capturing range 40 of the further virtual camera 4 is opposite to the capturing range 30 of the virtual camera 3. The further virtual image 41 can be generated analogously to the virtual image 31. In particular, the further virtual image 41 comprises both areas, which represent the environment U, and areas, which represent the interior of the vehicle 1. The areas of the further virtual image 41, which represent the interior of the vehicle 1, can be generated by animation. The areas of the further virtual image 41, which represent the environment U, can be generated from the respective images of the cameras 2. In particular, the areas of the further virtual image 41, which represent the environment U, are generated by cropping, stretching, compressing and composing the respective images of the cameras 2.

In order to even better visualize the reflection on the interior mirror 5, the perspective of the further virtual image 41 can be adapted to the image of a virtual camera 4, the camera position of which is determined by mirroring the virtual camera position of the virtual camera 3. This is illustrated in FIG. 2a and in FIG. 2b. The virtual camera position of the further virtual camera 4 is set by mirroring the virtual camera position of the virtual camera 3 on the mirror surface of the interior mirror 5. Thus, the further virtual camera 4 is shifted opposite to the virtual camera 3.

The perspective of the virtual image 31 is further shifted towards the surface of the interior mirror 5 related to FIG. 4. This is also visible in FIG. 2a and FIG. 2b. In FIG. 2b, the virtual camera 3 of the mirror 5 contacts the surface of the interior mirror 5. The virtual camera is shifted by a vector 36 between FIGS. 2a and 2b. This shift according to the vector 36 is also visualized in the virtual image 31 besides the shift of the perspective of the virtual image 31 in that the image-in-image representation of the further virtual image 41 is continuously enlarged in the virtual image 31. When the virtual camera 3 reaches the mirror plane of the interior mirror 5, thus, the further virtual image 41 occupies the entire area of the virtual image 31. Thus, the perspective of the virtual image 31 can be rotated, in particular by 180°.

In FIG. 3, this rotation of the perspective is illustrated. This rotation of the perspective by 180° is adapted to a rotation of the virtual camera 3 by 180°. After the rotation, the virtual camera 3 is in a second virtual camera position 44. The virtual camera image of the second perspective is adapted to a virtual camera image of the virtual camera 3 in the second virtual camera position 44. Thus, an area rearwards related to the vehicle 1 is represented by the virtual image in the second perspective. Preferably, the area of the environment U rearwards related to the vehicle 1 is represented without representation of the interior of the vehicle 1 in the second perspective. In other words, a representation of the rearward area of the environment U is generated, in which the interior of the vehicle 1 is not represented. Thus, a representation of the rearward area of the environment U results, which is adapted to a representation of the rearward area U by the interior mirror 5, wherein the vehicle 1 is transparently represented. In still other words, a representation of the rearward area of the environment U related to the vehicle 1 results from the perspective of the interior mirror 5 with a transparent vehicle rear.

The invention claimed is:

1. A method for generating a representation of an environment of a vehicle, the method comprising:
  capturing a first image by a first camera;
  capturing a second image by a second camera;
  generating a virtual image of a virtual camera from the first image and the second image,
  wherein at least a first perspective for a first virtual camera position of the virtual camera and a second perspective for a second virtual camera position of the virtual camera are selectable for the virtual image,
  wherein the environment of the vehicle is represented from a bird's eye perspective in the first perspective and exclusively an area of the environment of the vehicle rearwards related to the vehicle is represented in the second perspective; and
  upon switching from the first perspective to the second perspective of the virtual image, continuously transferring the representation of the environment from the first perspective to the second perspective such that the representation of the environment by the virtual image is adapted to a shift of the virtual camera towards an interior mirror of the vehicle upon switching and to a rotation of the virtual camera upon reaching a mirror plane of the interior mirror.

2. The method according to claim 1, wherein further virtual image for a further virtual camera is generated from the first image and the second image and is integrated in the virtual image in terms of an image-in-image representation during switching.

3. The method according to claim 2, wherein a perspective of the further virtual image is opposite to a perspective of the virtual image during switching.

4. The method according to claim 2, wherein a reflection of the area of the environment of the vehicle rearwards related to the vehicle is represented in the interior mirror by the further virtual image.

5. The method according to claim 1, wherein a capturing range of the virtual camera in the second virtual camera position is adapted to the capturing range of the interior mirror.

6. The method according to claim 1, wherein upon switching from the first perspective to the second perspective of the virtual image, the perspective of the virtual image is shifted from outside of the vehicle through a rear window of the vehicle towards the interior mirror such that the representation by the virtual image is adapted to a shift of the virtual camera from outside of the vehicle through the rear window of the vehicle towards the interior mirror upon switching.

7. The method according to claim 1, wherein the virtual camera is rotated by an angle between preferably 170° and 190°, upon reaching the mirror plane of the interior mirror.

8. The method according to claim 1, wherein during switching, areas, which represent an interior of the vehicle, are generated by animation in the virtual image and only areas of the virtual image, which represent the environment of the vehicle, are generated from the first image and the second image.

9. The method according to claim 8, wherein when the virtual camera is within the vehicle during switching, exclusively areas of the virtual image, which represent windows of the vehicle, are generated from the first and the second image.

10. A computer program product with program code means, which are stored in a non-transitory computer-readable medium, configured to perform a method for generating a representation of an environment of a vehicle according to claim 1, when the computer program product is run on a processor of a computing unit.

11. A non-transitory computer-readable medium in which program code means are stored, to perform a method for generating a representation of an environment of a vehicle according to claim 1, when the program code means are loaded into a memory of a computing unit and run on a processor of the computing unit.

12. A camera device for generating a representation of an environment of a vehicle, comprising:
a first camera for capturing a first image;
a second camera for capturing a second image; and
a computing unit for generating a virtual image of a virtual camera from the first image and the second image,
wherein at least a first perspective with a first virtual camera position of the virtual camera and a second perspective with a second virtual camera position of the virtual camera are selectable for the virtual image, and
wherein the computing unit is formed to represent the environment of the vehicle from a bird's eye perspective in the first perspective and to represent exclusively an area of the environment of the vehicle rearwards related to the vehicle in the second perspective,
wherein the computing unit is configured to continuously transfer the representation of the environment from the first perspective to the second perspective upon switching from the first perspective to the second perspective of the virtual image such that the representation of the environment by the virtual image is adapted to a shift of the virtual camera towards an interior mirror of the vehicle upon switching and to a rotation of the virtual camera upon reaching a mirror plane of the interior mirror.

* * * * *